United States Patent [19]
Daly

[11] Patent Number: 5,150,433
[45] Date of Patent: Sep. 22, 1992

[54] HISTOGRAM/VARIANCE MECHANISM FOR DETECTING PRESENCE OF AN EDGE WITHIN BLOCK OF IMAGE DATA

[75] Inventor: Scott J. Daly, Scottsville, N.Y.

[73] Assignee: Eastman Kodak Company, Rochester, N.Y.

[21] Appl. No.: 444,470

[22] Filed: Dec. 1, 1989

[51] Int. Cl.$^5$ .................... G06K 9/46; H04N 1/415
[52] U.S. Cl. ..................................... 382/56; 382/18; 382/22; 358/426; 358/433
[58] Field of Search .................. 382/18, 22, 51, 56; 358/426, 261.1, 281.2, 261.3, 427, 433, 447, 462, 464, 465, 466, 467

[56] References Cited

U.S. PATENT DOCUMENTS

| | | | |
|---|---|---|---|
| 4,774,569 | 9/1988 | Morton et al. | 382/22 |
| 4,774,574 | 9/1988 | Poly et al. | 358/138 |
| 4,780,761 | 10/1988 | Daly et al. | 358/133 |
| 4,797,945 | 1/1989 | Suzuki et al. | 382/56 |

Primary Examiner—David K. Moore
Assistant Examiner—Barry Stellrerht
Attorney, Agent, or Firm—Edward Dugas

[57] ABSTRACT

An edge detection mechanism for an imagery signal compression and transmission system processes histogram and variance data to identify the presence of a uniform area with a block of transform signals. The presence of an edge within an image block, for which corresponding transform coefficients are obtained, is identified by initially generating a histogram of the image block. If the maximum value of the histogram exceeds a first threshold value, a uniform area is inferred, and adaptive quantization that would otherwise be carried out prior to executing a minimum redundancy encoding scheme is bypassed. If the maximum value of the histogram does not exceed the first threshold value, a set of variance calculations is carried out for use with a further sequence of edge detection decisions. The total variance and low frequency variance of the block are determined in accordance with the transform coefficients associated with the image block. The results of these variance calculations are then processed with further thresholds and the histogram maximum value. If the absence of an edge is inferred, the transform coefficients associated with the image block are quantized using adaptive quantization.

22 Claims, 2 Drawing Sheets

HISTOGRAM/VARIANCE MECHANISM FOR DETECTING PRESENCE OF AN EDGE WITHIN BLOCK OF IMAGE DATA

FIELD OF THE INVENTION

The present invention relates in general to block transform digital image signal compression, and is particularly directed to a technique for detecting the presence of a high contrast edge within a block of image-representative signals.

BACKGROUND OF THE INVENTION

U.S. Pat. No. 4,774,574, entitled "Adaptive Block Transform Image Coding Method and Apparatus", by S.J. Daly et al, assigned to the assignee of the present application, and the disclosure of which is incorporated herein, describes a mechanism for transmitting an image (in the form of digitally encoded image-representative signals) over a bandwidth-limited communication channel, by means of an adaptive block image transform signal processing scheme that takes advantage of the reduced sensitivity of human vision to noise in the presence of image detail. As part of the compression process carried out at the transmit end of the system, blocks of transform coefficients produced from a (two-dimensional) spatial frequency block transformation process are quantized in accordance with a model of the visibility of quantization error in the presence of image detail. Because the presence of sharp edges between uniform areas will produce energy in the transform coefficients (in approximate proportion to the inverse of the spatial frequency represented by the coefficients), an edge detection mechanism is executed prior to determining the normalization factor. If such an edge is detected, the adaptive component of the normalization process for the block is effectively disabled.

In the preferred embodiment described in the patent, detection of an edge within an image block is accomplished by summing the absolute values of the first m coefficients and comparing the sum to a prescribed threshold value. Alternatively, a more sophisticated edge detector may be implemented by calculating the ratio of the variance of the low frequencies in the image block to the variance of all the frequencies of the block, with a high ratio indicating the presence of an edge. (This variance ratio calculation may be carried out in parallel with the (discrete cosine transform) compression process, and the results employed in the course of determining the normalization factors.)

Further investigation by the present inventor has revealed that a considerable improvement in image quality can be obtained by modifying the more sophisticated edge detector (which makes use of image frequency variances) to include information derived from a histogram of the image block. When the variance information is processed in accordance with the histogram, whether or not an edge is present can be determined with considerably greater precision than when using the simple summation method or the more computationally intensive variance-ratio scheme.

SUMMARY OF THE INVENTION

More particularly, in accordance with the present invention, the presence of a high contrast edge between relatively uniform areas within an image block, for which a corresponding block of image transform coefficients are obtained, is identified by initially generating a histogram of the image block. If the maximum value of the histogram exceeds a first threshold value, the block contains a large uniform area. The uniform area is important since errors associated with the use of the adaptive part of the process will not be visible unless a uniform area is within the block. It should be noted that if the block is entirely uniform and does not contain an edge, the masking process may be bypassed since it will have no effect. As a consequence, an adaptive quantization process that would otherwise be carried out prior to executing a minimum redundancy encoding scheme is bypassed and the transform coefficients associated with the image block are quantized with the non-adaptive component of the normalization process and encoded for transmission over the bandwidth-limited channel. If, however, the maximum value of the histogram does not exceed the first threshold value, a set of variance calculations is carried out for use with a further sequence of edge detection decisions.

Specifically, the total variance and low frequency variance of the block are determined in accordance with the transform coefficients associated with the image block. The results of the total variance calculation are then compared with a second threshold. If the total variance is less than the second threshold value, the absence of an edge is inferred, and the transform coefficients associated with the image block are quantized using the adaptive quantization process described in the above-cited patent. However, if the total variance is not less than the second threshold value, the ratio of the low frequency variance to the total variance is compared with a third threshold value. If this compared ratio exceeds the third threshold value, an edge is inferred (whereby the transform coefficients associated with the image block are directly quantized and encoded). On the other hand, if the compared ratio does not exceed the third threshold value, before the absence of an edge is inferred, a further refinement of the decision process is carried out based upon the maximum value of the previously derived histogram.

More particularly, as in the first step of the edge detection process, the maximum value of the histogram is compared to a (fourth) threshold, the value of which is considerably less than that used in the initial step of the process. If the maximum histogram value is less than the fourth threshold value, the absence of even localized uniform areas (i.e. occupying smaller area than that detected by the first threshold operation) is inferred and the transform coefficients are quantized of the image block are adaptively quantized prior to encoding. However, if the maximum histogram value is greater than the fourth threshold, namely the maximum histogram value falls between the initial or first histogram threshold value (which is sufficiently large to clearly demarcate the presence of a uniform area) and the smaller histogram threshold value, thereby implying that the histogram data indicates that there may be a small uniform area within the block, reference is again made to the previously calculated variance ratio to refine the decision whether or not to bypass the adaptive normalization process. (Namely, if a lower contrast edge is present, the adaptive step is bypassed.)

In this step the previously calculated variance ratio is compared to a fifth threshold value. If the compared ratio is greater than the fifth threshold, a lower contrast edge is inferred and adaptive quantization of the transform coefficients is bypassed, since the fourth threshold indicated the presence of a local uniform area within the block. Otherwise, the absence of an edge is inferred, and the transform coefficients are adaptively quantized prior to encoding.

DETAILED DESCRIPTION

Figure 1:
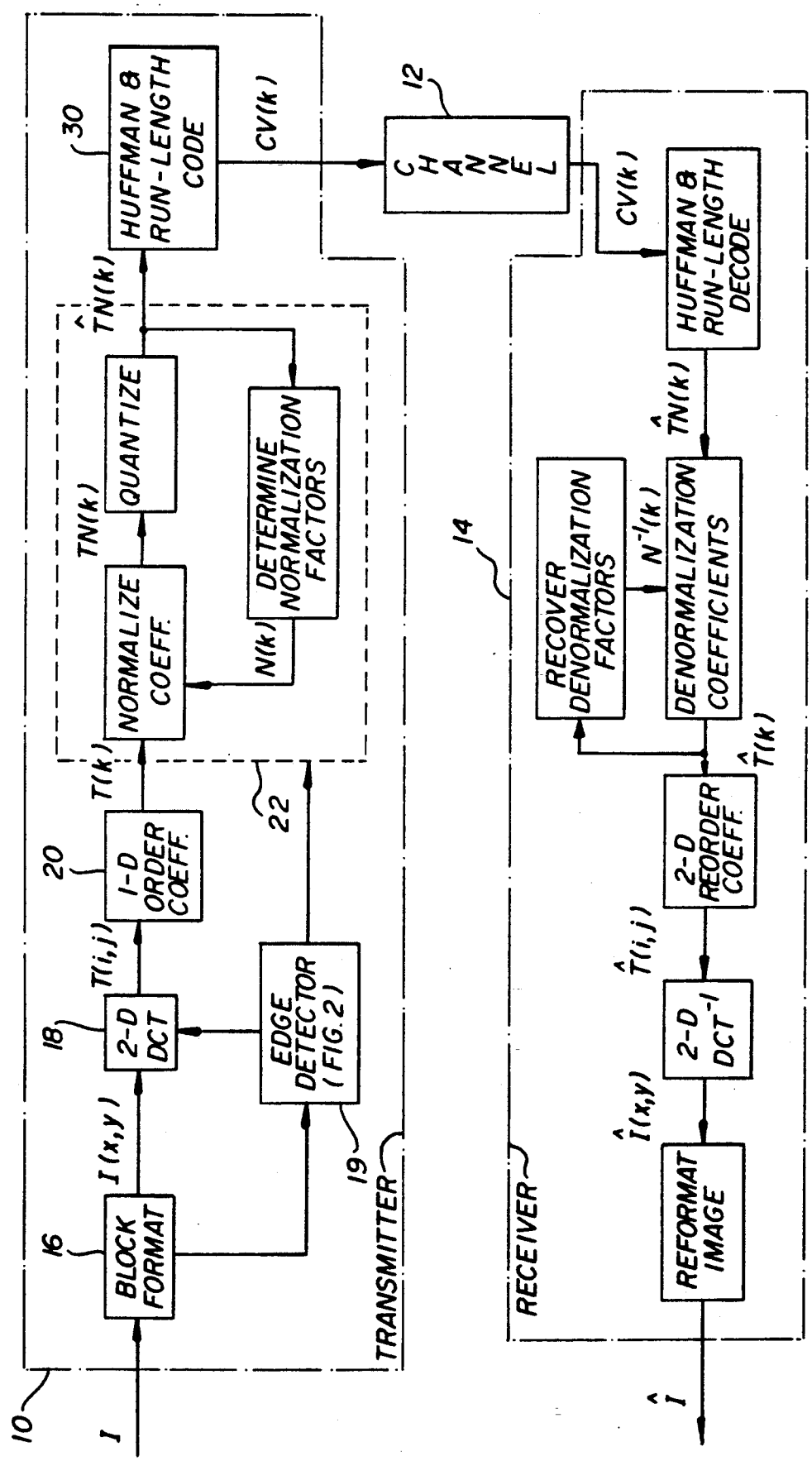
FIG. 1 is a block diagram of an imagery signal processing system for compressing and transmitting digital image signals.

Before describing in detail the particular improved histogram/variance dependent edge detection mechanism in accordance with the present invention, it should be observed that the present invention resides primarily in a novel combination of signal processing steps that are readily executed using conventional communication and signal processing circuits and components. Accordingly, the structure, control and arrangement of such conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the overall image data compression and transmission system in a convenient functional grouping, whereby the present invention may be more readily understood.

As pointed out previously, the present invention is directed to an improvement of the image processing and transmission scheme described in the above-referenced Daly et al patent, and is particularly directed to a modification of the edge detection process carried out at the transmitter prior to quantization and encoding of the image block transform coefficients. Consequently, except for the details of the edge detection process to be described here, attention may be directed to the patent itself for a explanation of the configuration and operation of the remainder of the system.

A block diagram of the system is shown in FIG. 1 as comprising a transmitter 10, which receives digital image representative signals from a source (not shown), such as an image sensor, film scanner or digital image recorder, and encodes the image signals for transmission over a bandwidth-limited communication channel 12, such as a conventional 3.3 kHz bandwidth telephone line, to a receiver 14, which decodes the compressed image signals so that the original image may be reconstructed. The configuration of the system shown in FIG. 1 is substantially identical to that shown in FIG. 1 of the above-referenced patent, except for the improved edge detector, and attention may be directed to the patent for details of those components of the system not described here.

Within transmitter 10, digital image input signals I are initially formatted (block format 16) into blocks for application to a two-dimensional discrete cosine transform 18 which generates corresponding blocks T(i,j) of transform coefficients. The transform coefficients for each block are ordered into a one-dimensional array 20, in order of increasing spatial frequency, and coupled to an adaptive quantizer 22. The quantized coefficients are then encoded, by way of a minimum redundancy (e.g. Huffman and run length) encoding mechanism 30, for transmission over channel 12 to receiver 14. As pointed out above, and as detailed in the above-referenced Daly et al patent, receiver 14 performs the inverse of the operations conducted at transmitter 10, so as to recover the original digital image signals.

Pursuant to the present invention, the image signal compression mechanism carried out within the transmitter includes a modified edge detector, shown at 19 in FIG. 1, that operates in conjunction with adaptive quantizer 22, for selectively identifying when an expected modification of the quantization interval, that is normally carried out by the adaptive quantization process 22, is to be bypassed, so that the transform coefficients may be quantized directly (as described in the U.S. Pat. to Daly et al, No. 4,780,761, and encoded for transmission. Namely, when an edge is detected, quantizer 22 does not execute adaptive normalization as part of the quantization process.

As mentioned briefly above, in the system described in the patent, detection of an edge within an image block is preferably accomplished by summing the absolute values of the first m coefficients and comparing the sum to a prescribed threshold value. As an alternative approach, the patent suggests a more sophisticated scheme, involving a calculation of the ratio of the variance of the low frequencies in the image block to the variance of all the frequencies of the block, with a high ratio indicating the presence of an edge. As a result of additional investigation by the present inventor, it has been determined that a considerable improvement in image quality can be obtained by modifying the variance ratio scheme to include information derived from a histogram of the image block. When the variance information is processed in accordance with the histogram, whether or not an edge is present can be determined with considerably greater precision than when using the simple summation method or the more computationally intensive variance-ratio scheme.

Figure 2:
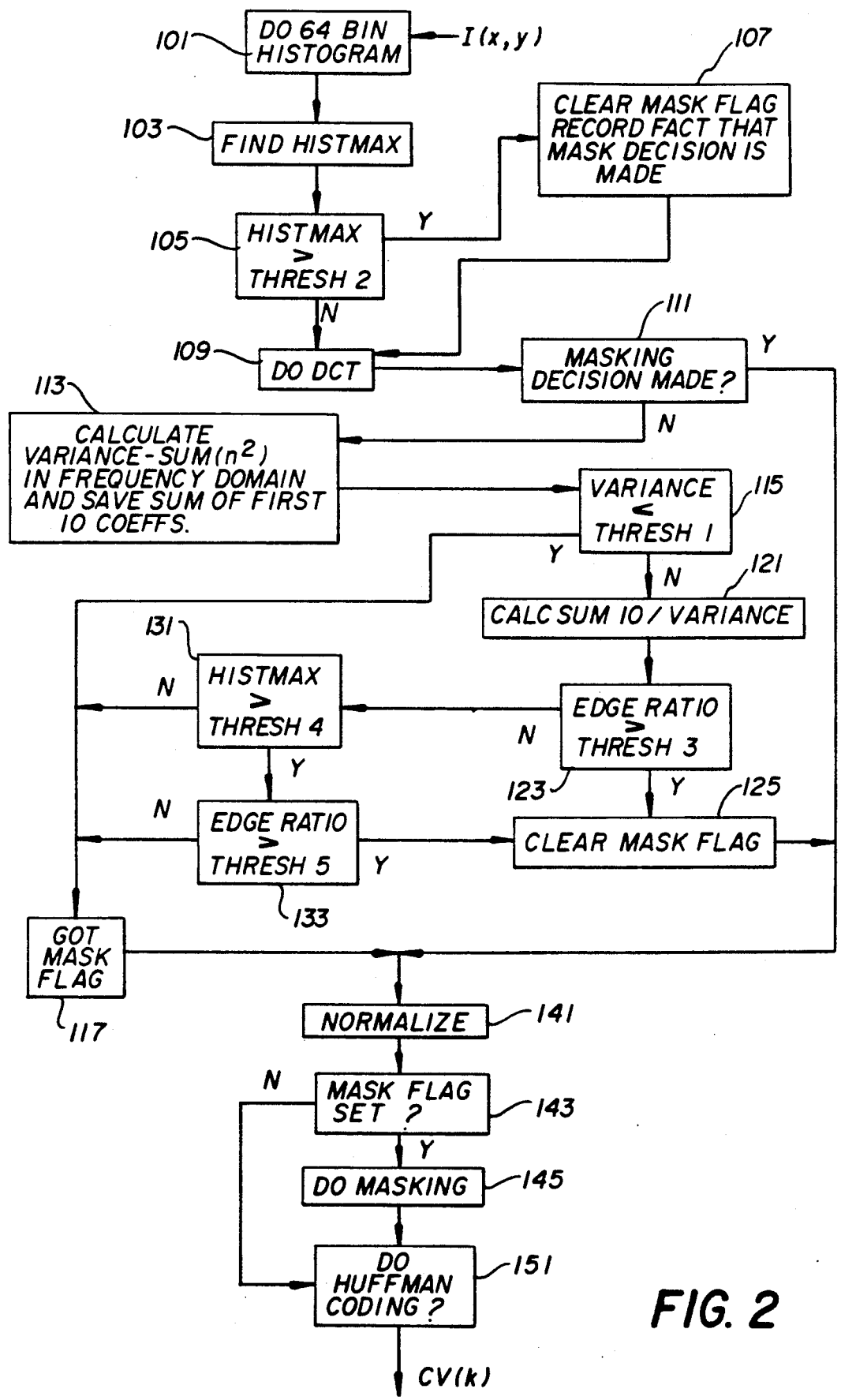
FIG. 2 shows the details of the improved edge detection mechanism of the present invention employed by the edge detector of the transmitter within the imagery signal processing system of FIG. 1.

More particularly, with reference to FIG. 2, which shows the details of the improved edge detection mechanism of the present invention, the presence of a uniform area within a block of image representative signals (provided by unit 16 in FIG. 1) is identified by initially generating a histogram of the image block. This initial step is carried out in the spatial domain and may be conducted either prior to or in parallel with the discrete cosine transform calculation (at 18 in FIG. 1). Generation of the histogram of the block (step 101) preferably employs bins that are larger (e.g. four times larger) than the code value transitions. Thus, for example, for an image having a code value range of 0 -255 (corresponding to $2''-256$ grey levels) the histogram will have $256/4 =64$ bins, with an exemplary bin having values 0-3.

After the histogram of the image block has been generated, its maximum value is determined in step 103 and the maximum value is compared with a first (uniform area-representative) threshold value in step 105. If the maximum value of the histogram exceeds this first threshold value, a uniform area is inferred. For this purpose, an adaptive quantization or 'mask' flag, which is read by the signal processor in the course of execution of the quantization process, is set at value indicating whether or not adaptive quantization is to be executed. If the 'mask' flag is set equal to one, adaptive quantization is to be carried out. If the flag is set to zero or cleared, adaptive quantization is to be bypassed. Thus, if the maximum value of the histogram exceeds the first threshold, the mask flag is cleared (step 107). The process then proceeds to execute the DCT coefficients (step 109, 18 in FIG. 1).

If, however, the maximum value of the histogram does not exceed the first threshold value (the result of step 105 is NO), the DCT coefficients are calculated (step 109) and the process executes a set of variance calculations for use with a further sequence of edge detection decisions based upon these coefficients and the previously generated histogram.

Specifically, at step 111 a determination is made as to whether or not the 'mask' flag is cleared. If the mask flag is cleared, the process jumps to the quantization and encoding of the coefficients, bypassing adaptive quantization, shown at (normalization) step 141, ('mask' cleared) step 143 and (Huffman encoding) step 151. If the 'mask' flag has been set to one (representing that the maximum value of the histogram is less than the first threshold, the total variance and low frequency variance of the block are determined in accordance with the transform coefficients associated with the image block (step 113). The low frequency variance may be calculated as the sum of the first MS squared coefficients (e.g. $MS = 10$), while the total variance is calculated as the sum of the squares of all the DCT coefficients, (256 coefficients for a $16 \times 16$ block).

The results of the total variance calculation are then compared with a second 'variance-defined edge' threshold (step 115). If the total variance is less than the second threshold value, the absence of an edge is inferred, causing the 'mask' flag to be set at one (step 117), and the transform coefficients associated with the image block are quantized using the adaptive quantization process (step 145) described in the above-cited patent. However, if the total variance is not less than the second threshold value, the ratio of the low frequency variance to the total variance (termed the edge ratio) is calculated (step 121) and this 'edge' ratio is compared with a third threshold value (step 123). If the 'edge' ratio exceeds the third threshold value, an edge is inferred and the mask flag is cleared (step 125). On the other hand, if the 'edge' ratio does not exceed the third threshold value, the absence of an edge is inferred, and a further refinement of the decision process is carried out based upon the maximum value of the previously derived histogram.

More particularly, as in the first step of the edge detection process, the maximum value of the histogram is compared to a threshold (step 131). In this instance, the value of the threshold is considerably (typically nearly an order of magnitude) less than that used in step 105. If the maximum histogram value is less than the fourth threshold value, the absence of an edge is inferred, the 'mask' flag is set to one (step 117), and the transform coefficients are quantized of the image block are adaptively quantized. However, if the maximum histogram value is greater than the fourth threshold, namely the maximum histogram value falls between the initial or first histogram threshold value (which is sufficiently large to clearly demarcate the presence of an edge) and the smaller histogram threshold value, thereby implying that the histogram data indicates the presence of a small uniform area within the block, reference is again made to the previously calculated variance ratio (calculated in step 121), in order to refine the decision as to whether or not a lower contrast edge is present.

Namely, in step 133, the previously calculated 'edge' ratio is compared to a fifth threshold value. If the 'edge' ratio is greater than the fifth threshold, an edge is inferred, causing the 'mask' flag to be cleared (step 125) and adaptive quantization of the transform coefficients is bypassed. Otherwise, the absence of an edge is inferred, the 'mask' flag is set to one (step 117), and the transform coefficients are adaptively quantized prior to encoding.

In the image processing mechanism according to the present invention, described above, the values of the thresholds are determined empirically in accordance with the particular application, such as a business graphics video image, a color film image, etc. and are independent of the image being processed. As the process proceeds through the threshold-comparison steps, for successive comparisons relative to the same data (e.g. histogram maximum value, variance ratio), the magnitudes of the threshold values become smaller (usually by an order of magnitude or more), so as to iteratively adjust and refine the sensitivity of the edge decision process. As a consequence, whether or not an edge is present can be determined with considerably greater precision than when using the simple summation method or a variance-ratio scheme, per se, thereby achieving a considerable improvement in image quality.

For purposes of providing an illustrative example, when applied to an eight bit resolution imagery signal representative of a 512 by 512 matrix of 262,144 image pixels associated with a digital video image, the respective threshold values associated with steps 105, 115, 123, 131 and 133 may have magnitudes of 150, 500, 0.50, 50 and 0.05. When contrasted with the above-referenced summation and variance edge detection schemes, the mechanism of the present invention provides an improvement in image quality on the order of ten percent and seven percent, respectively.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. For use with a signal processing mechanism for compressing signals representative of an image for transmission over a bandwidth-limited communication channel, in which blocks of transform coefficients, that have been obtained by subjecting said signals to a spatial frequency block transformation process, are quantized and the quantized transform coefficients encoded for transmission over said channel, a method of detecting the presence of an edge within an image block for which a corresponding block of image transform coefficients is obtained, comprising the steps of:

(a) generating a histogram of said image block;
   (b) determining prescribed variance characteristics of said image block in accordance with transform coefficients associated with said image block; and
   (c) identifying whether or not an edge is present within an image block in dependence upon said histogram and said prescribed image variance characteristics.

2. A method according to claim 1, wherein step (c) comprises identifying whether or not an edge is present within an image block in dependence upon the maximum value of said histogram and said prescribed variance characteristics.

3. A method according to claim 2, wherein said prescribed variance characteristics include the total variance and the ratio of the low frequency variance to the total variance.

4. A method according to claim 2, wherein step (b) comprises determining the total variance and low frequency variance of said block in accordance with transform coefficients associated with said image block.

5. A method according to claim 4, wherein step (c) includes the step of
  (c1) in response to the maximum value of said histogram exceeding a first threshold value, generating a first output signal indicating the presence of a uniform area and proceeding to quantize transform coefficients associated with said image block.

6. A method according to claim 5, wherein step (b) includes the step of, in response to the maximum value of said histogram not exceeding said first threshold value, determining the total variance and low frequency variance of said block in accordance with the transform coefficients associated with said image block 7. A method according to claim 6, wherein step (c) further includes the step of
  (c2) in response to the total variance being less than a second threshold value, generating a second output signal indicating the absence of an edge, and proceeding to quantize the transform coefficients associated with said image block in accordance with a prescribed adaptive quantization process, but in response to the total variance not being less than said second threshold value, comparing the ratio of said low frequency variance to said total variance with a third prescribed threshold value and, upon said ratio exceeding said third prescribed threshold value, generating said first output signal and proceeding to quantize the transform coefficients associated with said image block.

8. A method according to claim 7, wherein step (c) further includes the step of
  (c3) in response said ratio not exceeding said third prescribed threshold value, comparing the maximum value of said histogram to a fourth threshold value and, upon the maximum histogram value being less than said fourth threshold value, quantizing the transform coefficients associated with said image block in accordance with said prescribed adaptive quantization process.

9. A method according to claim 8, wherein step (c) further includes the step of
  (c4) in response to the maximum value compared in step (c3) being greater than said fourth prescribed threshold, comparing said ratio to a fifth threshold value, and generating said first output signal and proceeding to quantize the transform coefficients associated with said image block upon said ratio exceeding said fifth threshold, but otherwise generating said second output signal and proceeding to quantize the transform coefficients associated with said image block in accordance with said prescribed adaptive quantization process.

10. A method according to claim 2, wherein said transform coefficients comprise discrete cosine transform coefficients.

11. For use with a signal processing mechanism for compressing signals representative of an image for transmission over a bandwidth-limited communication channel, in which blocks of transform coefficients, that have been obtained by subjecting said signals to a spatial frequency block transformation process, are quantized and the quantized transform coefficients encoded for transmission over said channel, a method of detecting the presence of an edge within an image block for which a corresponding block of image transform coefficients is obtained, comprising the steps of:
  (a) generating a histogram of said image block;
  (b) in response to the maximum value of said histogram exceeding a first threshold value, generating a first output signal indicating the presence of an edge and proceeding to quantize the transform coefficients associated with said image block;
  (c) in response to the maximum value of said histogram not exceeding said first threshold value, determining the total variance and low frequency variance of said block in accordance with the transform coefficients associated with said image block;
  (d) in response to the total variance being less than a second threshold value, generating a second output signal indicating the absence of an edge, and proceeding to quantize the transform coefficients associated with said image block in accordance with a prescribed adaptive quantization process;
  (e) in response to the total variance not being less than said second threshold value, comparing the ratio of said low frequency variance to said total variance with a third prescribed threshold value and, upon said ratio exceeding said third prescribed threshold value, generating said first output and proceeding to quantize the transform coefficients associated said image block;
  (f) in response said ratio not exceeding said third prescribed threshold value, comparing the maximum value of said histogram to a fourth threshold value and, upon the maximum histogram value being less than said fourth threshold value, generating the transform coefficients associated with said image block in accordance with said second prescribed quantization process;
  (g) in response to the maximum value compared in step (f) being greater than said fourth prescribed threshold comparing said ratio to a fifth threshold value, and generating said first output signal and proceeding to quantize the transform coefficients associated with said image block said ratio exceeding said fifth threshold, but otherwise generating said second output signal and proceeding to quantize the transform coefficients associated with said image block in accordance with said adaptive quantization process.

12. For use with an imagery signal processing system for compressing signals representative of an image, for transmission over a bandwidth-limited communication channel, in which blocks of transform coefficients, that have been obtained by subjecting said signals to a spatial frequency block transformation process, are quantized and the quantized transform coefficients encoded for transmission over said channel, a signal processing arrangement for detecting the presence of an edge within an image block for which a corresponding block of image transform coefficients is obtained, comprising:

first means, responsive to said spatial frequency block transformation process, for generating first signals representative of a histogram of said image block, and generating second signals, representative of prescribed variance characteristics of said image block, in accordance with transform coefficients associated with said image block; and second means for processing said first and second signals from said first means and identifying whether or not an edge is present within an image block in dependence upon said histogram and said prescribed image variance characteristics.

13. An imagery signal processing arrangement according to claim 12, wherein said second means includes means for identifying whether or not an edge is present within an image block in dependence upon the maximum value of said histogram and said prescribed variance characteristics.

14. An imagery signal processing arrangement according to claim 13, wherein said prescribed variance characteristics include the total variance and the ratio of the low frequency variance to the total variance.

15. An imagery signal processing arrangement according to claim 13, wherein said first means includes means for determining the total variance and low frequency variance of said block in accordance with transform coefficients associated with said image block.

16. An imagery signal processing arrangement according to claim 15, wherein said second means includes means, responsive to the maximum value of said histogram exceeding a first threshold value, for generating a first output signal which indicates the presence of a uniform area and in response to which the transform coefficients associated with said image block are quantized.

17. An imagery signal processing arrangement according to claim 16, wherein said first means includes means, responsive to the maximum value of said histogram not exceeding said first threshold value, for determining the total variance and low frequency variance of said block in accordance with the transform coefficients associated with said image block.

18. An arrangement according to claim 17, wherein said third means includes means, responsive to the total variance being less than a second threshold value, for generating a second output signal indicating the absence of an edge, in response to which the transform coefficients associated with said image block are quantized in accordance with an adaptive quantization mechanism.

19. An arrangement according to claim 18, wherein said third means includes means, responsive to the total variance not being less than said second threshold value, for comparing the ratio of said low frequency variance to said total variance with a third prescribed threshold value and, upon said ratio exceeding said third prescribed threshold value, generating said first output signal in response to which the transform coefficients associated with said image block are quantized.

20. An arrangement according to claim 19, wherein said third means further includes means, responsive to said ratio not exceeding said third prescribed threshold value, for comparing the maximum value of said histogram to a fourth threshold value and, upon the maximum histogram value being less than said fourth threshold value, generating said second output signal in response to which transform coefficients associated with said image block are quantized in accordance with said adaptive quantization mechanism.

21. An arrangement according to claim 20, wherein said third means further includes means, responsive to the maximum value of said histogram being greater than said fourth prescribed threshold, for comparing said ratio to a fifth threshold value and, upon said ratio exceeding said fifth threshold, generating said first output signal in response to which the transform coefficients associated with said image block are quantized, but otherwise generating said second output signal in response to which the transform coefficients associated with said image block are quantized in accordance with said adaptive quantization mechanism.

22. An arrangement according to claim 14, wherein said transform coefficients comprise discrete cosine transform coefficients.

* * * * *